United States Patent [19]
Blanton

[11] 3,721,455
[45] March 20, 1973

[54] WHEEL STABILIZER
[75] Inventor: Grover Blanton, Deming, N. Mex.
[73] Assignee: Steer Safe, Inc., Deming, N. Mex.
[22] Filed: Feb. 24, 1971
[21] Appl. No.: 118,338

[52] U.S. Cl..............................280/94, 280/124 A
[51] Int. Cl.................................................B60g 3/00
[58] Field of Search...........................280/94, 124 A

[56] References Cited

UNITED STATES PATENTS 3,393,919   7/1968   Ragsdale................................280/94
3,448,991   6/1969   Leggett..................................280/94

Primary Examiner—P. Goodman
Attorney—Clarence A. O'Brien and Harvey B. Jacobson

[57] ABSTRACT

A spring structure for connection between the oscillatable wheel support of a vehicle and a vehicle chassis relative to which the wheel support is oscillatable about an upstanding axis. The spring structure is operable to yieldingly resist angular displacement of the wheel support structure from a first predetermined position in either direction and includes structure operable to yieldingly resist angular displacement of the wheel support from the first position in either direction with a force gradually increasing at a first rate of increase as the support is displaced from the first position to a second position and thereafter at a second lower rate of increase as the wheel support is displaced passed the second position.

10 Claims, 8 Drawing Figures

Grover Blanton
INVENTOR.

BY Clarence A. O'Brien
and Harvey B. Jacobson
Attorneys

Grover Blanton
INVENTOR.

WHEEL STABILIZER

Vehicles provided with steerable wheels usually have the steerable wheel thereof mounted in a manner such that the weight of the portions of the vehicle supported from the steerable wheels tends to return the steerable wheels to straight forward or neutral steering positions. This built-in steering return not only serves to assist the drive of a vehicle in steering the latter but also renders a "feel" to the vehicle steering wheel, in most cases, whereby the operator of the vehicle can sense, by feel, whether the steerable wheels of the vehicle are disposed in their normal straight ahead or neutral steering positions. In addition, this self-centering feature built into the steering geometry of conventional motor vehicles serves to lessen the tendency of slightly worn steering components to oscillate and, in some cases, would tend to maintain the steerable wheels of a vehicle in their neutral positions should some portion of the steering mechanism of the vehicle fail.

However, this built-in tendency of the steerable wheels of conventional motor vehicles to return to straightforward positions diminishes as the steerable wheels approach the straightforward positions thereof and the resistance to turning of the steering wheel of the vehicle increases as the wheels are turned from their straightforward positions. Thus, and especially since the forces tending to return the wheels to straightforward positions diminishes as the wheels approach their straightforward positions, the steering geometry of motor vehicles is such that the built-in tendency of the steering wheels thereof to return to straightforward positions is not sufficient to return the steerable wheels to their straightforward positions in the event of steering mechanism failure under all operating conditions. Further, the built-in return of the steerable wheels to straightforward positions in all but totally ineffective to act as a take-up for worn steering components when the steerable wheels are in or close to their straightforward positions.

Accordingly, it is the main object of this invention to provide a wheel stabilizer assembly for the steerable wheels of vehicles which will function to act effectively on the steerable wheels even when the latter approach their straightforward positions in returning the steerable wheels to their full straightforward positions.

Another object of this invention, in accordance with the immediately preceding object, is to provide a wheel stabilizing assembly which will yieldingly resist angular displacement of the steerable wheels of a vehicle from their straightforward positions in either direction with a force gradually increasing at a first rate of increase as the steerable wheels are displaced from their straightforward positions to a second position and thereafter at a second lower rate of increase as the support wheels are displaced pass the second positions thereof.

A final object of this invention to be specifically enumerated herein is to provide a wheel stabilizer in accordance with the preceding objects which will conform to conventional forms of manufacture, be of simple construction and automatic in operation so as to provide a device that will be economically feasible, long lasting and relatively trouble free.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
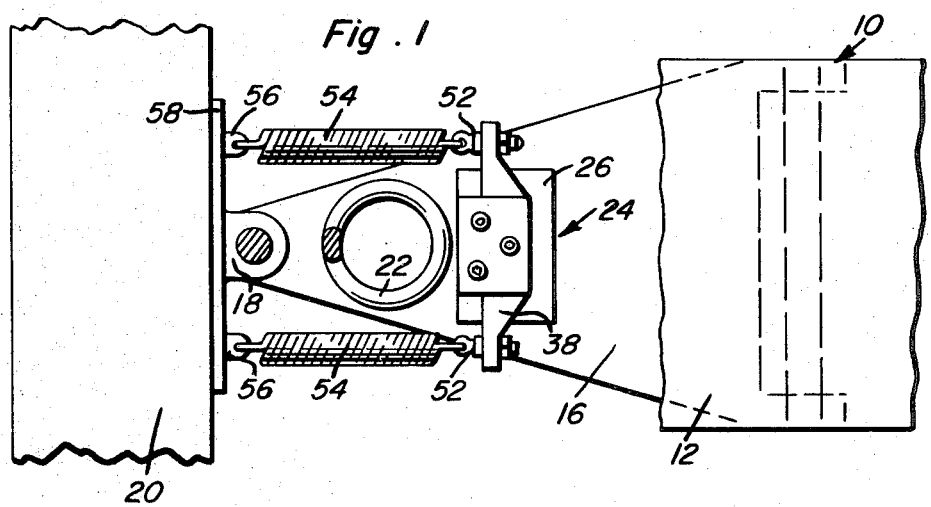
FIG. 1 is a somewhat schematic fragmentary plan view of one side of the front part of the understructure of a motor vehicle incorporating a first embodiment of the wheel stabilizer of the instant invention and with portions of the understructure broken way and illustrated in horizontal section.

Referring now more specifically to the drawings, the numeral 10 generally designates a vehicle chassis including a forward corner mounting portion 12. A pair of upper and lower A-frames 14 and 16 are oscillatably supported from the chassis 10 at their inboard ends about horizontal axes extending longitudinally of the chassis 10 and the outer ends of the A-frames 14 and 16 include support portions 14' and 16' from which a wheel support member 18 is oscillatably supported for angular displacement about an upstanding axis. The wheel support member 18 includes a horizontal spindle portion (not shown) upon which a wheel 20 is journaled and a helical compression spring 22 is disposed between the under and upper surface portions of the mounting portion 12 and the lower A-frame 16, respectively.

The foregoing comprises a description of conventional vehicle front wheel suspension structure and is not, by itself, to be considered other than conventional.

The stabilizer of the instant invention is referred to in general by the reference numeral 24 and includes a base or mounting plate 26 secured to a convenient upper surface portion 27 of the lower A-frame 16 inboard of the spring 22 in any convenient manner. The plate 26 has a plurality of threaded bores 28, 30 and 32 formed therethrough and disposed at the apexes of a central triangular region of the plate 26. An anti-friction bearing plate 34 has similar apertures 36 formed therethrough registered with the apertures 28, 30 and 32 is disposed over the upper surface of the plate 26 and an elongated front to rear extending fulcrum lever overlies the upper surface of the bearing plate 34, the fulcrum lever 38 being provided with a large aperture 40 registered with the bore 32 and the corresponding aperture 36. The fulcrum lever 38 additionally includes a pair of longitudinally spaced semi-cylindrical notches 40 and 42 registrable with the bores 28 and 30 and the corresponding apertures or bores 36. A plurality of headed and threaded fasteners 44 have their threaded lower ends threadedly engaged in the bores 28, 30 and 32. The shank portions of the fasteners 44 also pass through the bores 36 formed in the bearing plate 34 and the fastener 44 secured in the bore 32 has its shank portion also passing through the aperture 40 with the shank portions of the remaining fasteners 44 being seated in the notches 40 and 42. A bearing plate 46 corresponding to the bearing plate 34 is disposed over the fulcrum lever 38 and receives the shank portions of the fasteners 44 through apertures formed therein corresponding to the apertures 36 and a retaining plate 48 is disposed over the bearing plate 46 and has bores formed therein through which the fasteners 44 extend, the undersurfaces of the enlarged heads of the fasteners 44 abutting against the upper surface of the retaining plate 48.

The opposite ends of the fulcrum lever 38 are provided with horizontal transverse bores 50 through which anchor members 52 are secured and a pair of tension springs 54 have one pair of corresponding ends thereof anchored to the anchors 52 and the other pair of corresponding ends thereof anchored relative to anchor brackets 56 carried by the backing plate portion 58 of the wheel support member 18.

In operation, the springs 54 are tensioned when the components hereinabove referred as disposed in their relative positions illustrated in FIGS. 1 and 2 of the drawings and thus serve to yieldingly resist angular displacement of the wheel support member 18 from the position thereof illustrated in FIGS. 1 and 2 of the drawings. Accordingly, the wheel 20 is biased toward a straight forward position such as that illustrated in FIGS. 1 and 2.

Figure 2:
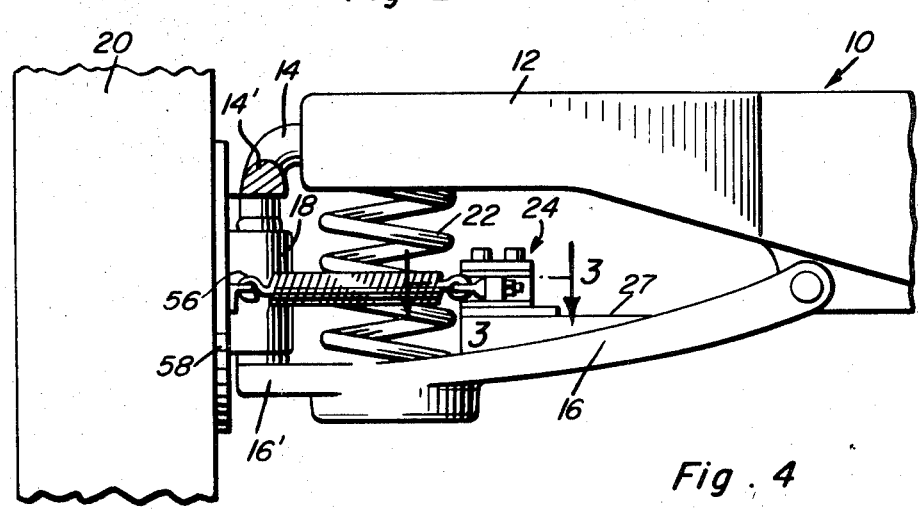
FIG. 2 is a fragmentary elevational view of the assemblage illustrated in FIG. 1 as seen from the lower side thereof.

When the steering wheel of the associated vehicle is turned and the steering linkage connected to the wheel support member 18 causes the latter to be angularly displaced from the positions thereof illustrated in FIGS. 1 and 2 of the drawings, one of the springs 54 is further tensioned and the other spring 54 is slightly relaxed.

Figure 3:
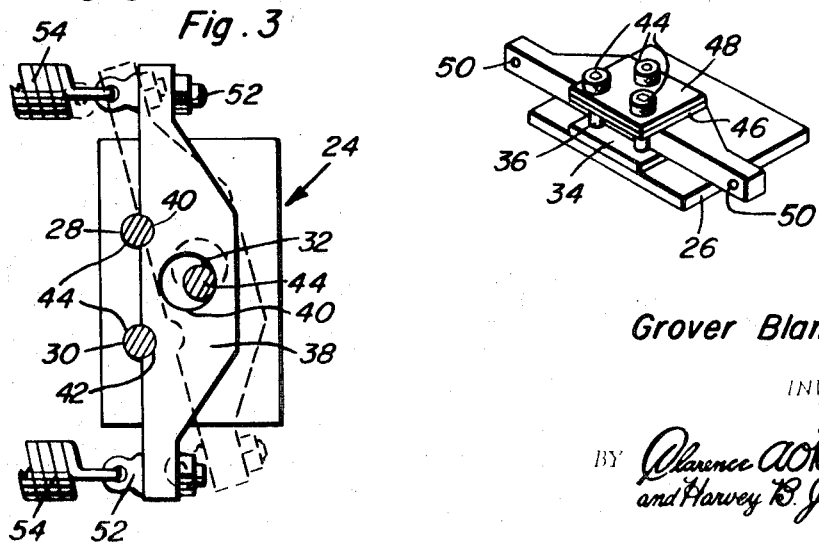
FIG. 3 is a fragmentary enlarged horizontal sectional view taken substantially upon the plane indicated by the section line 3—3 of FIG. 2.
Figure 4:
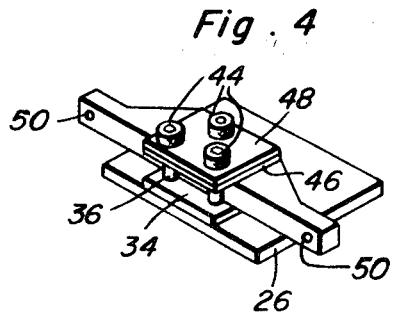
FIG. 4 is a perspective view of the wheel stabilizer illustrated in FIGS. 1 through 3 minus its expansion springs.

As long as the angular displacement of the wheel support member 18 in either direction does not exceed a predetermined angular displacement from the centered or straight ahead position of the wheel 20, the notches 40 are seated against the shank portions of the fasteners 44. However, if the wheel support member 18 is oscillated past the aforementioned predetermined position in a direction turning the wheel 20 to the left, the fulcrum lever 38, instead of being maintained stationary, is angularly displaced from the solid line position thereof illustrated in FIG. 3 of the drawings about the axis of oscillation defined by the pivot fastener 44 extending through the bore 28 toward the phantom line position of the fulcrum lever 38 in FIG. 3.

In this manner initial angular displacement of the wheel support member in either direction toward the aforementioned predetermined angularly displaced position away from a dead center position is resisted by the corresponding spring 54 with a force gradually increasing at a first rate of increase. However, after the wheel support member 18 is displaced to the aforementioned predetermined position and their passed, angular displacement of the fulcrum lever 38 about the pivot fastener 44 secured through the bore 28 results in the springs 54 resisting further angular displacement of the wheel support member 18 from its straight forward position with a force gradually increasing at a second lower rate of increase. Thus, although the wheel support member 18 is yieldingly biased toward the center position when only slightly angularly displaced therefrom with a force of a given magnitude increasing as further angular displacement of the wheel support member 18 from the straight forward position is effected, when the aforementioned predetermined position of angular displacement from the straight forward position is reached the rate of increase of the force resisting further angular displacement of the wheel support member 18 is reduced. Thus, by mounting the fulcrum lever 38 for oscillation in opposite directions about the fasteners 44 secured to the bores 28 and 30, the maximum resistance to angular displacement of the wheel support member 18 from the straight forward position is reduced although the effective resistance to slight angular displacement of the wheel support member may be at a predetermined desired level. Of course, as the fulcrum lever 38 is oscillated from the solid line position thereof illustrated in FIG. 3 of the drawings to the phantom line position thereof, the lower spring 54 is relaxed at a lesser rate while the upper spring 54 is tensioned at a lower rate.

The center aperture 40 formed in the fulcrum lever 38 is larger than the diameter of the shank portion of the corresponding fastener 44 and defines limits of oscillation of the fulcrum lever 38 about the fasteners 44 secured through the bores 28 and 30 and the limits of oscillation of the fulcrum lever 38 may thus be controlled by the size of the aperture 40 in relation to the diameter of the shank portion of the corresponding fastener 44.

Figure 5:
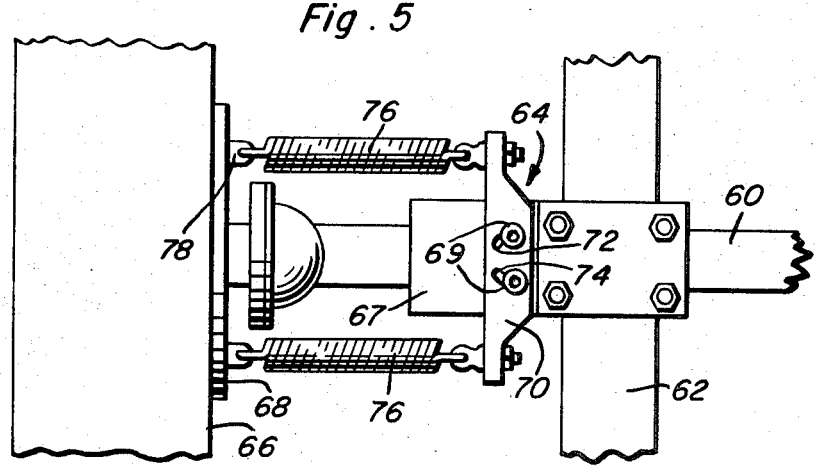
FIG. 5 is a plan view similar to FIG. 1 illustrating a first modified form of the wheel stabilizer as applied to the front steerable wheels of a four-wheel drive vehicle equipped with front longitudinal leaf springs.
Figure 6:
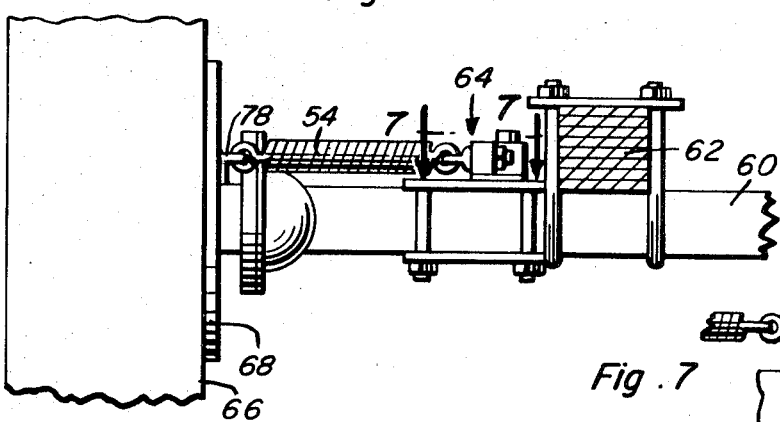
FIG. 6 is a fragmentary elevational view of the embodiment illustrated in FIG. 5, as seen from the lower side thereof.
Figure 7:
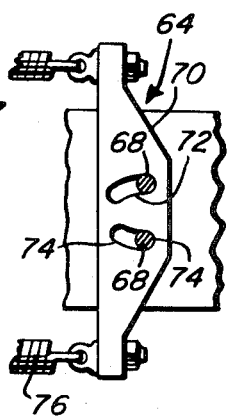
FIG. 7 is an enlarged fragmentary horizontal sectional view taken substantially upon the plane indicated by the section line 7—7 of FIG. 6.

With attention invited now more specifically to FIGS. 5 and 6 of the drawings there may be seen a solid transverse axle 60 of a front wheel vehicle supported from the corresponding chassis by means of opposite side longitudinal leaf spring 62. A stabilizer similar to the stabilizer 24 and referred to in general by the reference numeral 64 is provided for the wheel 66 journaled on the outboard end of the axle 60 and having a backing plate 68 corresponding to the backing plate 58 operatively associated therewith. The stabilizer 64 includes an axle mounted mounting plate 67 having a pair of upstanding fasteners 69 secured thereto and a fulcrum lever 70, see also FIG. 7, is provided. The fulcrum lever 70 has a pair of arcuate slots 72 and 74 formed therein and the slots 72 and 74 include corresponding rounded end portions 72' and 74' in which the shank portions of the fasteners 69 are seated, the center axes of the shank portions of the fasteners 69 illustrated in FIG. 7 comprising the centers of curvature of the slots 72 and 74. Of course, expansion springs 76 corresponding to the springs 54 are connected between the ends of the fulcrum lever 70 and the anchor brackets 78 carried by the backing plate 68. The head of the fasteners 69 are enlarged and overlie the upper surface portions of the fulcrum lever 70 disposed about the slots 72 and 74 and thus retain the fulcrum lever 70 on the plate 67.

It may of course be noted that the operation of the stabilizer 64 is substantially identical to the operation of the stabilizer 24.

Figure 8:
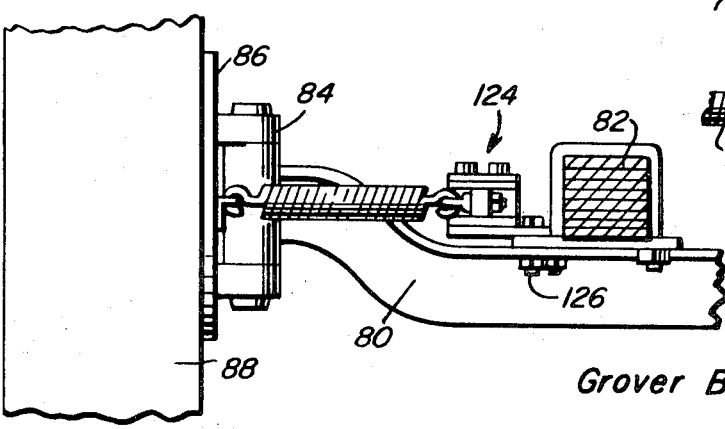
FIG. 8 is a fragmentary front elevational view similar to FIG. 6 but illustrating the modified form of wheel stabilizer utilized in conjunction with a vehicle provided with a front transverse I-beam axle.

With attention now invited more specifically to FIG. 8 of the drawings, there may be seen a solid transverse axle 80 supported from an associated vehicle (not shown) by means of a longitudinal leaf spring 82 and upon whose outer end a wheel support member 84 corresponding to the wheel support member 18 is oscillatably supported. The wheel support member 84 includes a backing plate 86 and a wheel 88 is journaled on the wheel support member 84. A stabilizer 124 corresponding directly to stabilizer 24 is mounted on the axle 80 by means of fasteners 126 and is operatively associated with the backing plate 86 in the same manner the stabilizer 24 is operatively associated with the backing plate 58. Thus, the operation of the stabilizer 124 is identical to the operation of the stabilizer 24.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a chassis including a wheel support oscillatable about an upstanding axis and having a wheel journaled therefrom, there being a first predetermined angular position of said support relative to said chassis, spring means connected between said chassis and said support yieldingly resisting angular displacement of the wheel support from said first position in at least one direction, said spring means including spring flexure modulating means operative to yieldingly resist angular displacement of said support from said first position in at least said one direction with a force increasing at a first rate as said wheel support is displaced from said first position and thereafter increasing at a second lower rate as said support is displaced past a second position.

2. The combination of claim 1 wherein said spring flexure modulating means includes an elongated generally horizontal fulcrum lever supported from said chassis for oscillation in a generally horizontal plane about front to rear spaced apart fulcrum points disposed along said lever intermediate its opposite ends, said spring means including elongated springs connected between opposite end portions of said lever and said wheel support at points spaced forward and rearward of the axis of oscillation of said wheel support.

3. The combination of claim 2 wherein said fulcrum points comprise stationary abutments disposed alongside one longitudinal edge of said lever, said one longitudinal edge including outwardly opening recesses in which said abutments are seatable.

4. The combination of claim 2 wherein said fulcrum points are defined by stationary upstanding guide members carried by said chassis, said lever including a pair of longitudinally spaced transversely extending arcuate slots through which said guide members are received, said slots including a first set of corresponding end portions, the centers of curvature of said slots being disposed in one set of corresponding ends thereof with the concave sides of said slots disposed adjacent each other.

5. The combination of claim 2 including vertically spaced generally horizontal opposing anti-friction bearing surfaces supported from said chassis between which at least the central portion of said lever is received for guiding action thereon.

6. In combination with a base from which a support is oscillatably supported for angular displacement about a predetermined axis, there being a first predetermined angular position of said support relative to said base, spring means connected between said base and said support yieldingly resisting angular displacement of the latter from said first position in at least one direction, said spring means including spring flexure modulating means operative to yieldingly resist angular displacement of said support from said first position in said one direction with the force gradually increasing at a first rate as said support is displaced from said first position to a second position and thereafter at a second lower rate as said support is displaced in said direction past said second position.

7. The combination of claim 6 wherein said spring flexure modulating means includes an elongated fulcrum lever oscillatable in a plane disposed generally normal to the axis of oscillation of said support about spaced apart fulcrum points spaced along said lever intermediate its opposite ends, said spring means including elongated springs connected between the opposite end portions of said lever and said support at points spaced on remote sides of the axis of oscillation of said support corresponding to the sides of the fulcrum points on which the ends of the springs remote from the support are anchored to the opposite end portions of said lever.

8. The combination of claim 7 wherein said fulcrum points are stationarily supported from said base and project through the plane of oscillation of said lever, one side of said lever adjacent said support having longitudinally spaced outwardly opening notches formed therein in which said fulcrum points are seatable.

9. The combination of claim 7 wherein said fulcrum points are defined by guide members stationarily supported from said base and extending through the plane of oscillation of said lever, said lever having a pair of transversely extending closed end slots formed therein spaced longitudinally of said lever, said slots being arcuate with their concave sides opening toward each other, the ends of said slots remote from said support defining the centers of curvature of said slots.

10. In combination with a chassis including a wheel support oscillatable about an upstanding axis and having a wheel journaled therefrom, there being a first predetermined angular position of said support relative to said chassis and said support being angularly displaceable, in opposite directions, from said first position to and past corresponding second positions, spring means connected between said chassis and said support yieldingly resisting angular displacement of the wheel support from said first position in either direction, said spring means including spring flexure modulating means operative to yieldingly resist angular displacement of said support from said first position in either direction with a force increasing at a first rate as said wheel support is displaced from said first position and thereafter increasing at a second lower rate as said support is displaced past said second positions.

* * * * *